Jan. 28, 1958  F. D. JONES  2,821,058
CORN HARVESTER
Filed Feb. 16, 1956
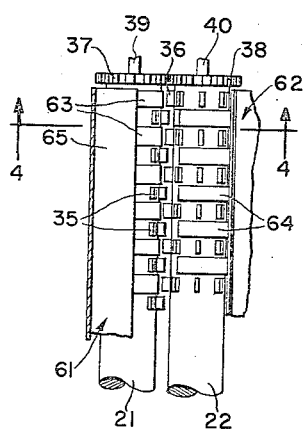
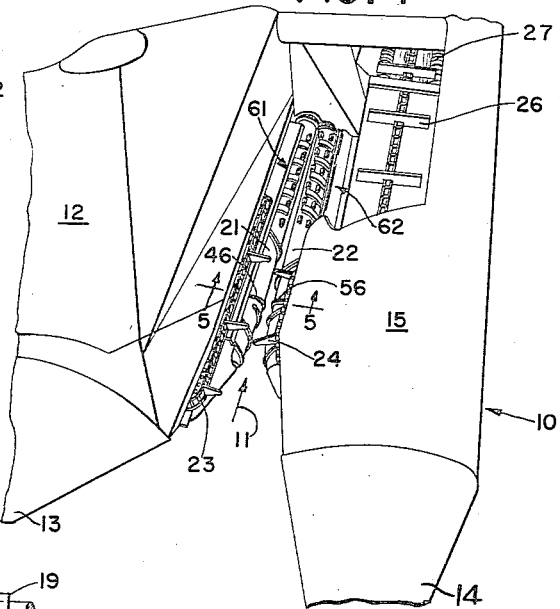
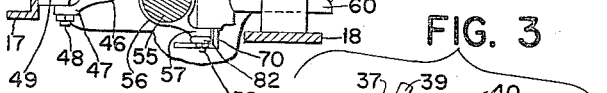
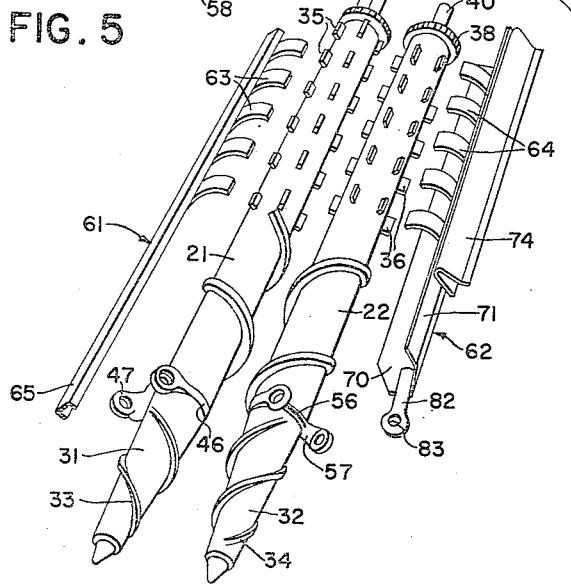
INVENTOR.
FRANK D. JONES

United States Patent Office 2,821,058
Patented Jan. 28, 1958

2,821,058

CORN HARVESTER

Frank D. Jones, Moline, Ill., assignor to Deere & Company, Moline, Ill., a corporation of Illinois Application February 16, 1956, Serial No. 565,826

10 Claims. (Cl. 56—108)

This invention relates to a corn snapping apparatus incorporated in a conventional type corn picker and has particular reference to a pair of snapping rolls and accompanying shield members which operate to prevent premature shelling of corn while the ears are being snapped or severed from the corn stalks.

One of the more serious problems which exists with the modern corn harvesting units is that of premature shelling of corn while the ears are being severed or removed from the stalks. In the more conventional type corn harvesters considerable of this premature shelling occurs in the initial stages of harvesting in which the pair of snapping rolls provided at opposite sides of the row of corn operate to drive the corn stalks downwardly to cause the ears of corn to be snapped or severed from the stalk when they come into contact with the rolls. While in theory the severed ears should slide over the snapping rolls, in actual practice this is not the situation and in many instances the butt or tip of the ears will be caught or wedged between the rolls with the ultimate result that considerable of the ear is shelled. Also when the field is harvested after the corn has reached extremely dry or mature stages, mere dropping or engagement of the ears with a lug or other similar projection on the rolls will cause kernels to be knocked from the ear. While there have been several attempts and methods to save or to collect the shelled corn occurring at this part of the harvesting operation, none has met with too much success and the shelled corn normally gravitates to the earth and is considered lost.

It is, therefore, the primary object of this invention to provide a corn snapping apparatus which will operate to limit actual contact between the ears of corn and the snapping rolls and which will also prevent the lugs or other sharp edges on the snapping rolls from being exposed thereby preventing shelling by the ears coming in contact with them.

It is also an object of this invention to incorporate in the above described apparatus a pair of shield members mounted outwardly of the snapping rolls and having ribbed portions extending inwardly and above the snapping rolls, the ribbed portions extending between the lugs on the snapping rolls and end substantially at the stalk passage between the rolls. The ribs will be spaced apart sufficiently to permit stalks, weeds and other foreign growth to pass between them but will be sufficiently close to prevent the ears of corn from contacting the rolls.

It is still a further object of this invention to provide in the above described apparatus a pair of snapping rolls having a plurality of rows of circumferentially spaced radially extending portions or lugs uniformly spaced axially along the rolls and adapted to extend between the lugs of the adjacent roll thus permitting the more aggressive stalk engaging lugs to extend substantially the width of the passage between the rolls.

It is yet a further object of this invention to provide means for moving the shield members laterally in unison with lateral adjustment of the rolls, it being recognized that lateral adjustment of the rolls to increase or decrease the gap between the rolls is old and presently in use in many of the more modern corn harvesters.

These and other objects of the invention will become apparent to those skilled in the art as the nature of the invention is understood from the following disclosure as described in conjunction with the accompanying drawings.

Fig. 1 is a front perspective of a corn harvester incorporating the principles of the invention.

Fig. 2 is a plan view of the upper portion of the snapping rolls and the associated shield means.

Fig. 3 is a front perspective and exploded view of the corn snapping apparatus.

Fig. 4 is a sectional view taken along the lines 4—4 of Fig. 2.

Fig. 5 is a sectional view taken along the lines 5—5 of Fig. 1.

The harvester selected for illustration may be considered representative in general of the usual tractor-mounted corn picker. This picker comprises a gathering unit, designated generally by the numeral 10, which defines a longitudinally extending gathering throat 11 into which standing stalks pass as the machine advances over the field. The gathering throat 11 is further defined by a tractor shield 12 which extends forwardly as a central divider plate 13, assuming this to be a two-row corn picker, and encloses the front end of the tractor. On the opposite side of the gathering throat from the divider point 13 is an outer gathering point 14 which is the forward end of a fathering unit housing 15. A suitable main support or frame, not generally shown but indicated as at 16, includes a pair of laterally spaced longitudinal running supporting members 17, 18 on which snapping rolls 21, 22 are mounted. For purposes of description the snapping roll positioned proximate to the tractor will be designated as the inner roll 21 and the opposite roll will be designated as the outer roll 22. Mounted above the snapping rolls 21, 22 are a pair of conventional type gathering chains 23, 24 which guide the standing stalks rearwardly as they pass through the harvesting unit. The inner gathering chain 23 is substantially longer than the outer gathering chain 24 which extends only partially the length of the snapping rolls, the purpose being obviously to assist ears of corn detached from the stalk to move laterally outwardly to a fore-and-aft extending conveyor 26 which moves the severed ears rearwardly to a crop treating or husking unit 27.

The lower ends of the snapping rolls 21, 22 are provided with conical points 31, 32, respectively, which have spiral ribs 33, 34 affixed thereto and serve to gather the stalks between the rolls during operation in a manner well known to those skilled in the art. The upper or rear ends of the snapping rolls 21, 22 are characterized by having a series of circumferential rows of radially extending portions or lugs 35, 36, respectively, uniformly spaced axially along the rolls 21, 22, the rows of lugs of each snapping roll extending between the rows of the other snapping roll. Adjacent to the lug portions of the snapping rolls are a pair of drive gears 37, 38 normally in mesh with one another and operate to drive the snapping rolls in unison. Roll shafts 39, 40 are journaled to the main frame 16 and are also provided with suitable drive means for operating the snapping rolls. For purposes of this disclosure details of the drive means is unimportant, but if more specific information is desired such may be found in U. S. Patent 2,721,431.

The forward portion of the inner snapping roll 21 has a reduced annular section, as at 45, for receiving a bearing bracket 46. The bearing bracket 46 is provided with a yoke 47 which is rigidly but detachably mounted on the roll supporting member 17 by means of a bolt and nut combination 48 which extends through the yoke and a frame portion 49 so positioned to receive the bolt.

The forward portion of the outer snapping roll 22 is provided with a reduced annular section 55 for receiving a bearing bracket 56 which has a yoke portion 57 which is detachably mounted by means of a bolt and nut combination 58 to a laterally movable hub member 59. Integral with the hub member 59 is a transverse shaft 60 which in turn is mounted for lateral adjustment in a housing support 19 fixed to the frame member 18. The gap or space between the snapping rolls 21 and 22 may be adjusted by moving the forward end of the snapping roll 22 laterally toward or away from the snapping roll 21. Lateral adjustment of the snapping rolls is old within the art and details have consequently been omitted. However, a typical type of lateral adjustment as herein considered is shown in the aforesaid U. S. Patent 2,721,431.

Positioned above and outwardly from the center of the snapping rolls are a pair of shield members 61, 62. The shield members 61, 62 are provided with inwardly extending rib members 63, 64 uniformly axially spaced along the member 61, 62 and adapted to be positioned between the respective rows of lugs 35, 36 on the snapping rolls 21, 22. The ribs 63, 64 terminate substantially at the gap or passage between the rolls 21, 22. The ribs 63, 64 are curved to the shape of the snapping rolls and are so positioned to permit the outer extremities of the lugs 35, 36 to project upwardly at a height substantially even to the upper surface of the ribs.

The shield member 61 is also composed of an elongated frame member 65 which has a vertical wall portion 66 positioned adjacent to a vertical section of the tractor shield 12 and is rigidly held adjacent thereto by a plurality of fore-and-aft spaced apart bolt members 67 extending through the two vertical members. A spacer member 68 is welded to an undersurface of the frame member 65. Each of the uniformly spaced ribs 63 is fixed to the spacer 68 and frame member 65 by means of welding as at 69.

The outer shield 62 is characterized by an elongated L-shaped frame member 70 with an upper portion 71 of the vertical leg turned inwardly as at 71. The uniformly spaced ribs 64 are welded to the frame 70 as at 72 and 73. Also fixed to the portion 71 of the L-shaped frame is an apron member 74 which is suitably spot-welded to the portion 71 and has a downwardly extending plate portion extending over the lip of a side panel 76 of the conveyor hopper. The rear portion of the L-shaped frame member 70 is pivotally mounted for lateral swinging to a bracket 80 which in turn is fixed to the main frame 16 of the corn harvester. The pivotal connection is by means of a bolt and nut combination 81 which extends through the bracket 80 in the lateral portion of the L-shaped frame mmeber 70. The L-shaped frame 70 is provided at its forward end with a forwardly extending arm 82 having an eye 83 at its forwardmost end which is adapted to fit adjacent to the lower leg of the yoke member 57 and to receive the bolt of the bolt and nut combination 58 which connects the yoke 57 to the laterally adjustable shaft 60. In this mounting arrangement, the shield member 62 will therefore be adjusted laterally in unison with a corresponding adjustment of the outer roll 22.

The ear snapping apparatus operates in the following manner. Upon the stalks being moved from the forward ends 31, 32 of the snapping rolls to the rearward portions of the rolls, the rolls become more aggressive in their snapping operation through a combination of having the rear portions positioned closer together as well as the increase aggressiveness created by the lug members 35, 36 which engage the stalks and drive them downwardly and away from the rolls thereby severing and depositing the ears of corn against the rib members 63, 64. In the snapping operation, the stalks, weeds, and other such material pass between the ribs 63, 64 to come into contact with the lugs 35, 36. However, the ends of the ribs 63, 64 are sufficiently close to prevent the severed ears from entering between the snapping rolls 21, 22, and the ribs of each shield are of sufficient proximity to one another to prevent the severed ears from passing through and engaging the lugs. Thus, not only does the present invention offer the advantage of preventing the ears from contacting the snapping rolls, but they also permit a more aggressive type of snapping roll to be used inasmuch as the shelling effect of the rolls has been eliminated.

While only one form of the invention has been shown it should be recognized that other forms and variations could exist without departing basically from the broad general principles herein disclosed. It should therefore be understood that while the preferred form of the invention has been described with the view of clearly and concisely illustrating its principles, it is desired not to so limit or narrow the invention beyond that which is claimed.

What is claimed is:

1. A corn harvester apparatus comprising a supporting frame; a pair of forwardly extending snapping rolls rotatably mounted on the frame and spaced apart laterally to provide a passage for stalks to pass, each of the rolls having a series of radially projecting portions spaced axially along the roll and extending between the radially projecting portions of the other roll, said portions aggressively engaging the stalks for driving the stalks downwardly and away from the rolls to thereby sever the ears of corn from the stalks; means on the frame for adjusting the rolls laterally to increase or decrease the lateral distance between the rolls; a pair of shield members, each member being fixedly mounted on the frame outwardly respectively of one of the rolls and including rib portions extending inwardly above and proximate to the rolls, the rib portions being interspaced between the radially extending portions of the rolls and having at least their inner surfaces radially inwardly of the outer extremities of the radially extending portions, the rib portions terminating substantially at the stalk-passage between the rolls and operative to limit contact between the ears of corn and the snapping rolls; and means on the frame operative to adjust said shield members laterally in unison with lateral adjustment of the snapping rolls.

2. A corn harvester apparatus comprising a supporting frame; a pair of forwardly extending snapping rolls rotatably mounted on the frame and spaced apart laterally to provide a passage for stalks to pass, each of the rolls having a series of radially projecting portions uniformly spaced axially along the roll and positioned to aggressively engage the stalks for driving the stalks downwardly and away from the rolls thereby severing the ears of corn from the stalks; means on the frame for adjusting the rolls laterally to increase or decrease the lateral distance between the rolls; a pair of shield members, each member being fixedly mounted on the frame outwardly respectively of one of the rolls and including rib portions extending inwardly above and proximate to the rolls, the rib portions being interspaced between the radially extending portions of the rolls and having at least their inner surfaces radially inwardly of the outer extremities of the radially extending portions, the rib portions terminating substantially at the stalk-passage between the rolls and operative to limit contact between the ears of corn and the snapping rolls; and means on the frame operative to adjust said shield members laterally in unison with lateral adjustment of the snapping rolls.

3. A corn harvester apparatus comprising a supporting frame; a pair of forwardly extending snapping rolls rotatably mounted on the frame and spaced apart laterally to provide a passage for stalks to pass, each of the rolls having a series of radially projecting portions spaced axially along the roll and positioned to aggressively engage the stalks for driving the stalks downwardly and away from the rolls thereby severing the ears of corn from the stalks; a pair of shield members, each member being fixedly mounted on the frame outwardly respectively of one of the rolls and including rib portions extending inwardly above and proximate to the rolls, the rib portions being interspaced between the radially extending portions of the rolls and having at least their inner surfaces radially inwardly of the outer extremities of the radially extending portions, the rib portions terminating substantially at the stalk-passage between the rolls and operative to limit contact between the ears of corn and the snapping rolls; and means on the frame operative to adjust said shield members relative to the snapping rolls.

4. A corn harvester apparatus comprising a supporting frame; a pair of forwardly extending snapping rolls rotatably mounted on the frame and spaced apart laterally to provide a passage for stalks to pass, each of the rolls having a series of radially projecting portions spaced axially along the roll and positioned to aggressively engage the stalks for driving the stalks downwardly and away from the rolls thereby severing the ears of corn from the stalks; and a pair of shield members, each member being fixedly mounted on the frame outwardly respectively of one of the rolls and including rib portions extending inwardly above and proximate to the rolls, and interspaced between the radially extending portions of the rolls, the rib portions terminating substantially at the stalk-passage between the rolls and operative to limit contact between the ears of corn and the snapping rolls.

5. A corn harvester appartus comprisnig a supporting frame; a pair of forwardly extending snapping rolls rotatably mounted on the frame and spaced apart laterally to provide a passage for stalks to pass, each of the rolls having a plurality of rows of circumferentially spaced lugs, said lugs serving to aggressively engage the stalks for driving the stalks downwardly and away from the rolls; means on the frame for adjusting the rolls laterally to increase or decrease the lateral distance between the rolls; a pair of shield members, each member being fixedly mounted on the frame outwardly respectively of one of the rolls and including rib portions extending inwardly above and proximate to the rolls, and interspaced between the rows of lugs on the rolls, the rib portions terminating substantially at the stalk-passage between the rolls and operative to limit contact between the ears of corn and the snapping rolls; and means on the frame operative to adjust said shield members laterally in unison with lateral adjustment of the snapping rolls.

6. A corn harvester apparatus comprising a supporting frame; a pair of forwardly extending snapping rolls rotatably mounted on the frame and spaced apart laterally to provide a passage for stalks to pass, each of the rolls having a plurality of rows of lugs, said lugs serving to aggressively engage the stalks for driving the stalks downwardly and away from the rolls; and a pair of shield members, each member being fixedly mounted on the frame outwardly respectively of one of the rolls and including rib portions extending inwardly, above and proximate to the rolls, and interspaced between the rows of lugs on the rolls, the rib portions terminating substantially at the stalk-passage between the rolls and operative to limit contact between the ears of corn and the snapping rolls.

7. The invention defined in claim 6, in which the ribs are so spaced from the snapping rolls a distance whereby the upper surface of the rib portions are at a substantially equal radial distance from the axis of the snapping roll as the radial outer end of the lugs.

8. The invention defined in claim 6, in which the rib portions are composed of a plurality of ribs spaced from one another to permit stalks to pass between them but sufficiently close to prevent ears of corn from passing between them.

9. A corn harvester apparatus comprising: a supporting frame; roll means forming with the frame a fore-and-aft extending passage and including at least one fore-and-aft extending roll rotatably mounted on the frame and having axially spaced apart lugs for aggressively engaging the stalks to drive them downwardly; and a rigid shield member fixedly mounted on the frame and including rib portions extending above and proximate to the rolls, and interspaced between the axially spaced lugs on the rolls to limit contact between the ears of corn and said snapping roll.

10. A corn harvester apparatus comprising a supporting frame; forwardly extending roll means rotatably mounted on the frame defining a fore-and-aft extending passage for stalks to pass and including at least one roll having a plurality of axially spaced apart lugs for aggressively engaging the stalks to drive the stalks downwardly and away from the roll means; and a shield member fixedly mounted on the frame outwardly respectively of the roll and including rib portions extending inwardly, above and proximate to the roll, and interspaced between the lugs on the rolls, the rib portions being operative to limit contact between the ears of corn and the roll.

References Cited in the file of this patent

UNITED STATES PATENTS

| | | |
|---|---|---|
| 1,056,727 | Asper | Mar. 18, 1913 |
| 2,480,209 | Aasland | Aug. 30, 1949 |
| 2,714,794 | Jarrard | Aug. 9, 1955 |